Patented Jan. 7, 1930

1,742,345

UNITED STATES PATENT OFFICE

CHESTER C. FEAGLEY, OF PHILADELPHIA, PENNSYLVANIA, ASSIGNOR, BY MESNE ASSIGNMENTS, TO THE GRASSELLI CHEMICAL COMPANY, OF CLEVELAND, OHIO, A CORPORATION OF DELAWARE

PRODUCTION OF BASIC ALUMINUM SULPHATE

No Drawing.   Application filed June 25, 1925.   Serial No. 39,605.

This invention relates to basic alminum sulphate and its production and has particular reference to a procedure whereby aluminum sulphate of high basicity and purity may be readily manufactured, and to the product of such procedure. It is the major object of the invention to provide such a procedure and product.

It is the desire in producing aluminum sulphate destined for certain uses, notably that of water purification, to make a material that is highly basic, that is, contains a proportion of alumina, $Al_2O_3$ greater than that required to give a neutral product. That is to say, considering aluminum sulphate, $Al_2(SO_4)_3$ as $Al_2O_3 3SO_3$, it is desirable that the ratio $Al_2O_3 : SO_3$ be materially greater than 1 : 3.

I have found that if alumina hydrate in excess and substantially without acid insolubles be treated with sulphuric acid, even without pressures above atmospheric, and the solution concentrated, then, even though the materials, particularly the alumina hydrate, contain substantially no insolubles, e. g., hydrated silica, clay, silca, titanium oxide. etc., aluminum sulphate of high basicity is produced (the same being substantially free from insolubles). Furthermore, I have found that the procedure may be successfully carried out whether or not iron be present; and thus by the present method I am enabled to produce, depending upon whether or not the raw materials contain iron, a product commercially iron-free or practically wholly iron-free, and substantialy free from insolubles in either case. In particular, I have found that alumina hydrate will very readily go into solution, in a solution of the type suggested above, e. g., one produced by treating alumina hydrate with sulphuric acid, to produce a highly basic alum, when the solution has a total $Al_2O_3$ content between 13% and 14.5%. The former is indicated by the solution having a density of 47° Bé. at boiling temperature, and the latter by the solution having a density of 52° Bé. boiling temperature.

Without restricting the invention thereto, the following will serve as an example of practice in accordance therewith:—

To a quantity of sulphuric acid, strength desirably about 35%, contained in an acid-proof tank equipped with steam coils is added alumina hydrate practically free from acid insolubles, in an amount to provide $Al_2O_3$ about 10 to 20% in excess of the theoretical amount necessary to combine with the sulphuric acid to form normal aluminum sulphate. The hydrate may desirably be that known commercially as "heavy alumina hydrate" and containing approximately 64% $Al_2O_3$. The hydrate is added gradually, say in about a half hour, with continuous boiling. The reaction will cause the density of the solution to increase from about 30° Bé. to 47° Bé. at boiling temperature. This rather dilute solution is now concentrated, by boiling, to 52° Bé. at boiling temperature. A sample is now taken and the basicity found by the well-known analytical methods. The basicity should be between 15.0% and 17.3% after all the alumina has gone into solution. (In referring to "basicity" as, say 17%, I mean that of the total $Al_2O_3$ present, 17% is in excess of the amount necessary to give normal sulphate.) If, however, the basicity is less than 15.0% the contents of the tank are diluted with water to approximately 47° Bé., boiling temperature, alumina hydrate in sufficient amount to increase the basicity to 15% to 17.3% is added and the solution again concentrated to 52° Bé. This procedure is repeated as often as necessary to bring the basicity to 15.0% to 17.3%. This basicity having been attained, the boiling and concentrating are continued until the contents of the reaction tank test 62.5° Bé. at boiling temperature, indicating a total $Al_2O_3$ content of about 18%. The reaching of this point indicates that the aluminum sulphate has become suitably basic. The hot and fluid contents of the tank may now be poured upon a suitable cooling floor, cooled and solidified, and afterward ground in the regular manner.

Thus produced in accordance with the invention, the finished product has a total alumina content of 18 to 18.5 per cent, of which 2.7 to 3.2% are in excess of that required for normal aluminum sulphate, so that the product has a basicity of 15.0% to 17.3%, and has an insoluble content of less than 1%.

As before indicated, the above procedure is not only applicable to materials containing no iron but is also applicable to materials containing iron, it being the fact, I have found, that normal aluminum sulphate solution containing some iron will dissolve alumina hydrate. Thus, with the above procedure, when sulphuric acid and alumina hydrate both practically free from iron are used (e. g., the acid may contain .001% Fe or less and similarly with the hydrate), a product practically free from iron can be produced; while with the materials containing some iron a commercially iron-free highly basic alum can be produced. By way of illustration, merely, a practically iron-free product may contain .004% iron, and a commercially iron-free product contain .4 to .7% iron, the iron being expressed as $Fe_2O_3$.

I claim:

1. The method of producing basic aluminum sulphate substantially free from insolubles which comprises adding to sulphuric acid heavy alumina hydrate, substantially free from insolubles, in excess of that required to react with the acid to produce normal aluminum sulphate, and concentrating the solution.

2. The method of producing iron-free basic aluminum sulphate substantially free from insolubles which comprises adding to iron-free sulphuric acid, heavy alumina hydrate, substantially free from iron and insolubles, in excess of that required to react with the acid to produce normal aluminum sulphate, and concentrating the solution.

3. The method of producing basic aluminum sulphate which comprises preparing an aluminum sulphate solution having a basicity of 15.0% to 17.3% and a total alumina content of approximately 13%, by adding to sulphuric acid heavy alumina hydrate, substantially free from insolubles, in excess of that required to react with the acid to produce normal aluminum sulphate, and concentrating the solution.

4. The method of producing iron free basic aluminum sulphate which comprises preparing an aluminum sulphate solution having a basicity of 15.0% to 17.3% and a total alumina content of approximately 13%, by adding to iron free sulphuric acid heavy alumina hydrate, substantially free from iron and insolubles, in excess of that required to react with the acid to produce normal aluminum sulphate, and boiling the solution to concentrate the same until the alumina content is about 18%.

5. The method of producing basic aluminum sulphate which comprises adding to about 35% sulphuric acid, alumina hydrate to give the solution a basicity on a 30° Bé. basis of 15.0% to 17.3% and a total alumina content of about 13%, and boiling the solution to concentrate the same to a density of about 62.5° Bé., at boiling temperature.

6. As an article of manufacture, basic aluminum sulphate substantially free from insolubles and having a percentage basicity of 15.0% to 17.3%.

7. As an article of manufacture, basic aluminum sulphate substantially free from insolubles and iron and having a percentage basicity of 15.0% to 17.3%.

In testimony whereof I affix my signature.

CHESTER C. FEAGLEY.